United States Patent
Hwang et al.

(10) Patent No.: US 11,659,430 B2
(45) Date of Patent: May 23, 2023

(54) ADAPTATION FRAMEWORK FOR UE POWER SAVING

(71) Applicant: MEDIATEK INC., Hsin-Chu (TW)

(72) Inventors: Chien-Hwa Hwang, Hsin-Chu (TW); Wei-De Wu, Hsin-Chu (TW); Yiju Liao, Hsin-Chu (TW); Cheng-Hsun Li, Hsin-Chu (TW); Chi-Hsuan Hsieh, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 17/739,047

(22) Filed: May 6, 2022

(65) Prior Publication Data
US 2022/0279373 A1    Sep. 1, 2022

Related U.S. Application Data

(63) Continuation of application No. 16/653,999, filed on Oct. 16, 2019, now abandoned.
(Continued)

(51) Int. Cl.
*H04W 28/02*    (2009.01)
*H04W 52/02*    (2009.01)
(Continued)

(52) U.S. Cl.
CPC ....... *H04W 28/0221* (2013.01); *H04L 5/0032* (2013.01); *H04W 36/0069* (2018.08); *H04W 52/0216* (2013.01); *H04W 72/51* (2023.01)

(58) Field of Classification Search
CPC ......... H04W 28/0221; H04W 52/0216; H04W 36/0069; H04W 72/048; H04W 72/0446;
(Continued)

(56) References Cited

U.S. PATENT DOCUMENTS

2011/0305224 A1    12/2011  Lin ............................... 370/336
2011/0319120 A1    12/2011  Chen et al. ................... 455/522
(Continued)

FOREIGN PATENT DOCUMENTS

CN    103327594 A    3/2012
CN    104584476 A    8/2012
(Continued)

OTHER PUBLICATIONS

Taiwan IPO, office action for the Taiwanese patent application 108134647 (no English translation is available) dated Apr. 21, 2022 (5 pages).
(Continued)

*Primary Examiner* — Jung Liu
(74) *Attorney, Agent, or Firm* — Imperium Patent Works; Zheng Jin

(57) ABSTRACT

A method of UE power profile adaptation to traffic and UE power consumption characteristics based on power profile is proposed. In one preferred embodiment, hybrid of bandwidth part (BWP) and power profile is proposed. UE is configured with multiple BWPs and each BWP includes a set of power profiles. Two types of adaptation triggering can be used, a first type of trigger is based on power saving signals sent from the network, and the second type of trigger is based on timers. When the traffic characteristic for UE changes, the network can send a power saving signal to UE to trigger power profile adaptation, e.g., BWP+power profile switching. When traffic has been digested and becomes sporadic, then power profile adaptation can be triggered based on timers, e.g., a timer for BWP adaptation and another timer for power profile adaptation.

20 Claims, 5 Drawing Sheets

Related U.S. Application Data

(60) Provisional application No. 62/754,700, filed on Nov. 2, 2018, provisional application No. 62/747,713, filed on Oct. 19, 2018.

(51) Int. Cl.
*H04W 36/00* (2009.01)
*H04L 5/00* (2006.01)
*H04W 72/51* (2023.01)

(58) Field of Classification Search
CPC ............ H04W 72/042; H04W 52/0229; H04L 5/0032; H04L 5/0053; H04L 5/001; H04L 5/0023; Y02D 30/70
See application file for complete search history.

(56) References Cited

U.S. PATENT DOCUMENTS

| | | | |
|---|---|---|---|
| 2014/0044040 A1 | 2/2014 | Chen et al. | 370/328 |
| 2015/0009815 A1 | 1/2015 | Hsu et al. | 370/230.1 |
| 2015/0110023 A1 | 4/2015 | Pan et al. | 370/329 |
| 2015/0334653 A1 | 11/2015 | Ang et al. | 370/311 |
| 2019/0253976 A1* | 8/2019 | Pelletier | H04W 52/146 |
| 2019/0281545 A1* | 9/2019 | Kim | H04W 72/23 |
| 2019/0281632 A1 | 9/2019 | Sha et al. | |
| 2020/0059345 A1 | 2/2020 | Pelletier et al. | |
| 2020/0163023 A1* | 5/2020 | Pelletier | H04W 52/38 |

FOREIGN PATENT DOCUMENTS

| | | |
|---|---|---|
| CN | 104363978 A | 6/2013 |
| CN | 107734597 A | 8/2016 |
| CN | 108135028 A | 2/2018 |
| TW | 201828667 A | 11/2016 |

OTHER PUBLICATIONS

Taiwan IPO, office action for the TW patent application 108134647 (no English translation is available) dated Apr. 16, 2021 (5 pages).
R1-1808279 3GPP TSG-RAN WG1 #94, MediaTek Inc., "UE power consumption adaptation based on traffic type", Gothenburg, Sweden, Aug. 20-24, 2018 (4 pages) *section 2*.
Taiwan IPO, office action for the TW patent application 108134647 (No. English translation is available) dated Aug. 31, 2020 (8 pages).
Taiwan IPO, office action for the TW patent application 108137616 (no English translation is available) dated Aug. 17, 2020 (8 pages).
R1-1810448 3GPP TSG-RAN WG1 #94bis, MediaTek Inc., "UE adaptation to the traffic and UE power consumption characteristics", Chengdu, China, Oct. 8-12, 2018 (7 pages) *sections 1-3*.
R1-1810449 3GPP TSG RAN WG1 Meeting #94bis, MediaTek Inc., "Consideration on triggering adaptation and the potential power saving benefit", Chengdu, China, Oct. 8-12, 2018 (5 pages). *section 2.1*.
International Search Report and Written Opinion of International Search Authority for PCT/CN2019/108426 dated Jan. 2, 2020 (8 pages).
International Search Report and Written Opinion of International Search Authority for PCT/CN2019/111864 dated Jan. 2, 2020 (10 pages).
R1-1812361 3GPP TSG-RAN WG1 #95, MediaTek Inc., Adaptation framework for UE power saving', Spokane, USA, Nov. 12-16, 2018 (12 pages) *paragraphs 2.2, 3.1.3 figures 5-7*.
R1-1810448 3GPP TSG-RAN WG1 #94bis, MediaTek Inc., "UE adaptation to the traffic and UE power consumption characteristics", Chengdu, China, Oct. 8-12, 2018 (7 pages) *paragraph 2.3, figure 4*.
R1-1810449 3GPP TSG RAN WG1 Meeting #94bis, MediaTek Inc., "Consideration on triggering adaptation and the potential power saving benefit", Chengdu, China, Oct. 8-12, 2018 (5 pages). *paragraphs 2.1, 2.2, and 2.3*.

* cited by examiner

ADAPTATION FRAMEWORK FOR UE POWER SAVING

CROSS REFERENCE TO RELATED APPLICATIONS

This application is a continuation, and claims priority under 35 U.S.C. § 120 from nonprovisional U.S. patent application Ser. No. 16/653,999, entitled "Adaptation Framework for UE Power Saving", filed on Oct. 16, 2019, the subject matter of which is incorporated herein by reference. Application Ser. No. 16/653,999, in turn, claims priority under 35 U.S.C. § 119 from U.S. Provisional Application No. 62/747,713, entitled "UE Adaptation to Traffic and Power Consumption Characteristics" filed on Oct. 19, 2018; and from U.S. Provisional Application No. 62/754,700, entitled "Adaptation Framework for UE Power Saving" filed on Nov. 2, 2018, the subject matter of each of the foregoing references is incorporated herein by reference.

TECHNICAL FIELD

The disclosed embodiments relate to wireless communication networks, and more specifically, to UE adaptation to traffic for UE power saving based on UE power consumption characteristics in next generation 5G new radio (NR) mobile communication networks.

BACKGROUND

A Long-Term Evolution (LTE) system offers high peak data rates, low latency, improved system capacity, and low operating cost resulting from simple network architecture. An LTE system also provides seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred as user equipments (UEs). Enhancements to LTE systems are considered so that they can meet or exceed International Mobile Telecommunications Advanced (IMT-Advanced) fourth generation (4G) standard.

The signal bandwidth for next generation 5G new radio (NR) systems is estimated to increase to up to hundreds of MHz for below 6 GHz bands and even to values of GHz in case of millimeter wave bands. Furthermore, the NR peak rate requirement can be up to 20 Gbps, which is more than ten times of LTE. Three main applications in 5G NR system include enhanced Mobile Broadband (eMBB), Ultra-Reliable Low Latency Communications (URLLC), and massive Machine-Type Communication (MTC) under milli-meter wave technology, small cell access, and unlicensed spectrum transmission. Multiplexing of eMBB & URLLC within a carrier is also supported.

In LTE and NR networks, Physical Downlink Control Channel (PDCCH) is used for dynamic scheduling. A plurality of physical resource blocks (PRBs) is allocated for PDCCH transmission that carry downlink control information (DCI). UE needs to monitor common search spaces and UE-specific search spaces for decoding PDCCH. In addition, UE needs to periodically measure the received signal quality of the serving cell and neighbor cells and reports the measurement result to its serving eNB for potential handover or cell reselection. To save power, Discontinuous Reception (DRX) needs to be applied in both Idle mode and Connected mode, with short awake times and long sleep cycles.

The study for NR UE power saving is started with identifying the use cases which power saving is essential. The different use cases may include: PDCCH only, low throughput, and high throughput. When comparing of NR and LTE power consumption, a first observation is that NR has much higher power consumption than LTE particularly at PDCCH only and low throughput. However, at high throughput, NR is relatively power efficient compared with LTE. For example, NR provides more than twice throughput of LTE with only 1.15 times power consumption.

Power consumption is a function of many factors, such as power amplifier (PA) efficiency, number of RF modules and baseband paths in circuits, active transmission/reception time, sleep mode duration, channel bandwidth, receiver processing latency/complexity, and so on. Some factors such as PA efficiency and receiver processing are implementation specific, while some others (e.g., sleep mode duration, channel bandwidth, etc.) may depend on network configuration. If these power relevant parameters are configured appropriately, power saving can be achieved without incurring undesirable side effects such as latency increase or throughput loss. The question is the interplay between network configuration and the quality of service of traffic. It has been observed that NR UE PHY setting adaptation with respect to traffic is helpful for UE power saving.

In multiuser wireless communication systems including NR, multiple access techniques are used to allow a large number of mobile users to share the spectrum in the most efficient manner. The sharing can be performed in the domains of time, frequency, space, etc. All UEs take turns to be served, and each particular UE is active only in part of the time, the system bandwidth, and the directions of signal arrival/departure, although allocated percentage of resource depends on the quality of service of the ongoing traffic. Obviously, it is wasteful in battery energy if a UE keeps alive in a domain which it can never be served. Thus, from the perspective of domains of multiple access, it is straightforward to see parameters relevant to time, frequency and space can be configured based on the traffic types for the purpose of power saving.

Solutions for NR UE power saving with UE adaptation based on traffic and UE power consumption characteristics are sought.

SUMMARY

A method of UE power profile adaptation to traffic and UE power consumption characteristics based on power profile is proposed. In one preferred embodiment, hybrid of bandwidth part (BWP) and power profile is proposed. UE is configured with multiple BWPs and each BWP includes a set of power profiles. Two types of adaptation triggering can be used, a first type of trigger is based on power saving signals sent from the network, and the second type of trigger is based on timers. When the traffic characteristic for UE changes, the network can send a power saving signal to UE to trigger power profile adaptation, e.g., BWP+power profile switching. When traffic has been digested and becomes sporadic, then power profile adaptation can be triggered based on timers, e.g., a timer for BWP adaptation and another timer for power profile adaptation.

In one embodiment, a UE receives a power profile configuration served by a base station in a serving cell. The power profile configuration comprises a list of power profiles, each power profile comprises a subset of power-related parameters corresponding to restricted ranges of values. The UE applies a first power profile associated with a first traffic characteristic. The UE detects a triggering condition for power profile adaptation. The UE applies a second power profile associated with a second traffic characteristic.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
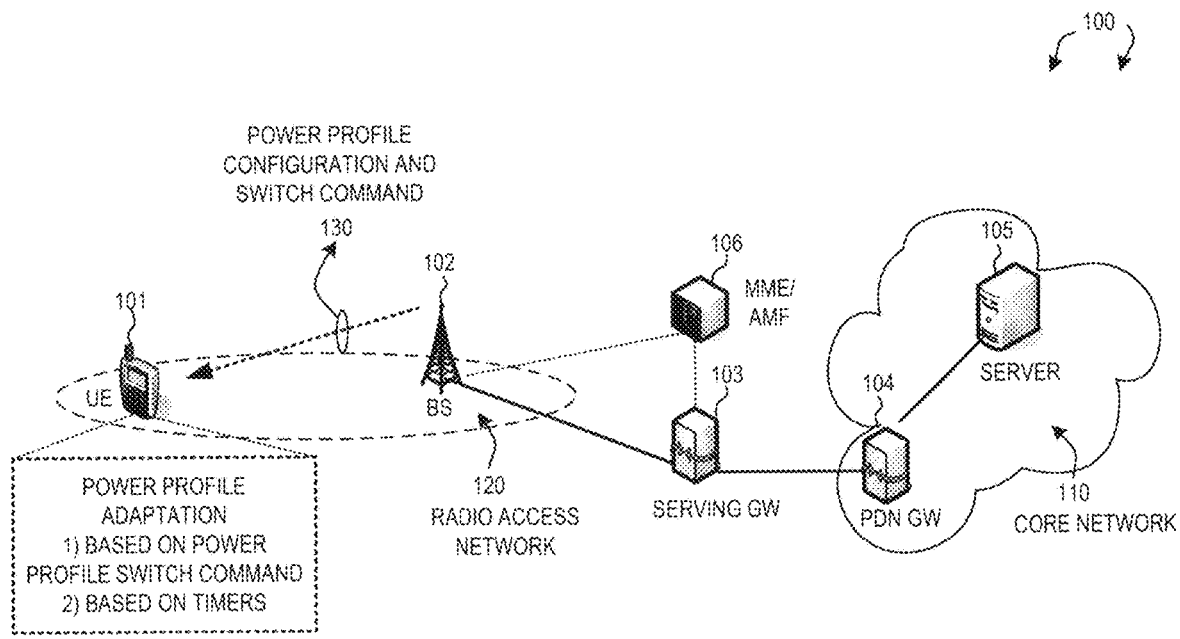
FIG. 1 illustrates a next generation new radio (NR) mobile communication network with user equipment (UE) parameter adaptation using power profiles for power saving in accordance with one novel aspect.

FIG. 1 illustrates a next generation new radio (NR) mobile communication network 100 with user equipment (UE) parameter adaptation using power profiles for power saving in accordance with one novel aspect. LTE/NR network 100 comprises application server 105 that provides various services by communicating with a plurality of user equipments (UEs) including UE 101. In the example of FIG. 1, application server 105 and a packet data network gateway (PDN GW or P-GW) 104 belong to part of a core network CN 110. UE 101 and its serving base station BS 102 belong to part of a radio access network RAN 120. RAN 120 provides radio access for UE 101 via a radio access technology (RAT). Application server 105 communicates with UE 101 through PDN GW 104, serving GW 103, and BS 102. A mobility management entity (MME) or an access and mobility management function (AMF) 117 communicates with BS 102, serving GW 103 and PDN GW 104 for access and mobility management of wireless access devices in LTE/NR network 100. UE 101 may be equipped with a radio frequency (RF) transceiver or multiple RF transceivers for different application services via different RATs/CNs. UE 101 may be a smart phone, a wearable device, an Internet of Things (IoT) device, and a tablet, etc.

When there is a downlink packet to be sent from the BS to the UE, each UE gets a downlink assignment, e.g., a set of radio resources in a physical downlink shared channel (PDSCH). When a UE needs to send a packet to the BS in the uplink, the UE gets a grant from the BS that assigns a physical uplink shared channel (PUSCH) consisting of a set of uplink radio resources. The UE gets the downlink or uplink scheduling information from an NR-PDCCH that is targeted specifically to that UE. In addition, broadcast control information is also sent in the NR-PDCCH to all UEs in a cell. The downlink and uplink scheduling information and the broadcast control information, carried by the NR-PDCCH, together is referred to as downlink control information (DCI).

UE power consumption is a function of many factors, such as power amplifier (PA) efficiency, number of RF modules and baseband paths in circuits, active transmission and reception time, sleep mode duration, channel bandwidth, receiver processing latency and complexity, and so on. Some factors such as PA efficiency and receiver processing are implementation specific, while some other factors (e.g., sleep mode duration, channel bandwidth, etc.) may depend on network configuration. If these power-relevant parameters are configured appropriately, power saving can be achieved without incurring undesirable side effects such as latency increase or throughput loss. It has been observed that NR UE PHY setting adaptation with respect to traffic is helpful for UE power saving.

Accordingly, the concept of power profile is introduced. A power profile comprises a set of restrictions on the indicated values of RRC parameters that are power consumption relevant. Each power profile targets for a particular traffic characteristic. More specifically, for each power profile, a set of power-related parameters are configured to best fit the operation condition such as traffic characteristic the power profile is targeted for. The motivation for power profile is achieving power saving by means of limiting the ranges of indicated values. For instance, if the processing time $K_0$ is always larger than 0 (i.e., cross-slot scheduling is used all the time), the UE can reduce the clock rate in processing PDCCH and reduces power consumption accordingly. UE applies power profile adaptation by switching to a different power profile when the traffic characteristic changes. In one embodiment, UE 101 is configured with multiple bandwidth parts (BWP) in a serving cell, and each BWP includes a set of power profiles.

In accordance with one novel aspect, two types of adaptation triggering can be used, a first type of trigger is based on power saving signals sent from the network, and the second type of trigger is based on timers. In the example of FIG. 1, UE 101 receives power profile configuration (130) from BS 102. UE 101 may be configured with multiple BWPs, and each BWP is further configured to include multiple power profiles. As depicted by 140, when the traffic characteristic for UE 101 changes, the network can send a power saving signal to UE 101 to trigger power profile adaptation, e.g., BWP+power profile switching. When traffic has been digested and becomes sporadic, then power profile adaptation can be triggered based on timers, e.g., a timer for BWP adaptation and another timer for power profile adaptation.

Figure 2:
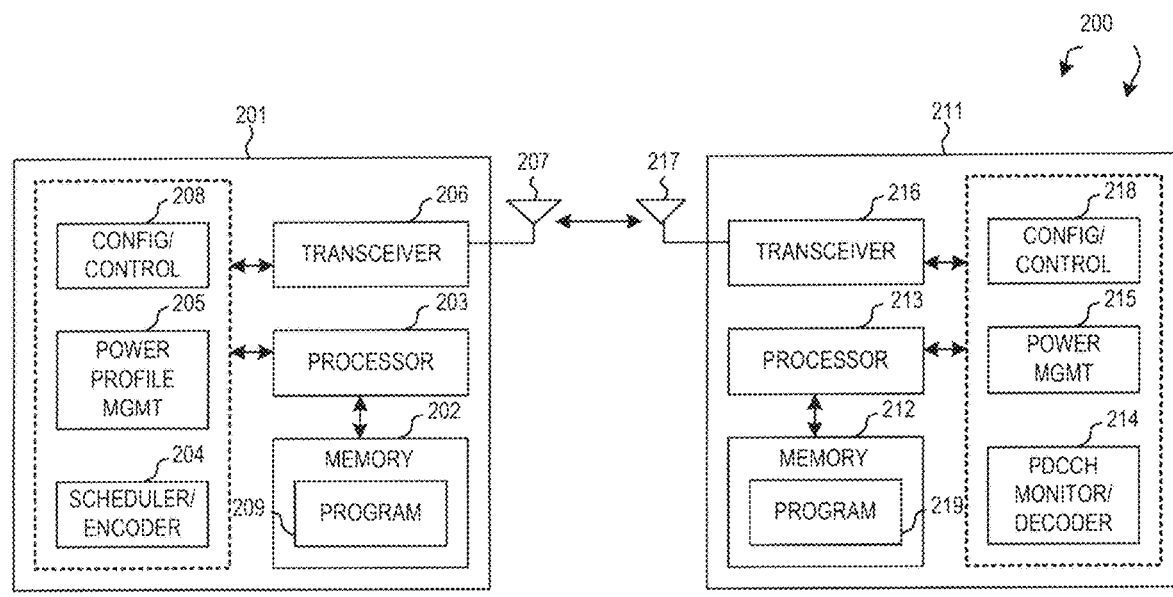
FIG. 2 illustrates simplified block diagrams of a base station and a user equipment in accordance with embodiments of the present invention.

FIG. 2 illustrates simplified block diagrams of a base station 201 and a user equipment 211 in accordance with embodiments of the present invention. For base station 201, antenna 207 transmits and receives radio signals. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207. Processor 203 processes the received baseband signals and invokes different functional modules to perform features in base station 201. Memory 202 stores program instructions and data 209 to control the operations of the base station.

Similar configuration exists in UE 211 where antenna 217 transmits and receives RF signals. RF transceiver module 216, coupled with the antenna, receives RF signals from the antenna, converts them to baseband signals and sends them to processor 213. The RF transceiver 216 also converts received baseband signals from the processor, converts them to RF signals, and sends out to antenna 217. Processor 213 processes the received baseband signals and invokes different functional modules to perform features in UE 211. Memory 212 stores program instructions and data 219 to control the operations of the UE.

The base station 201 and UE 211 also include several functional modules and circuits to carry out some embodiments of the present invention. The different functional modules and circuits can be implemented by software, firmware, hardware, or any combination thereof. In one example, each function module or circuit comprises a processor together with corresponding program codes. The function modules and circuits, when executed by the processors 203 and 213 (e.g., via executing program codes 209 and 219), for example, allow base station 201 to config power profiles for UE 211 and transmit downlink control information to UE 211 for power profile adaptation, and allow UE 211 to receive and decode the downlink control information and perform power profile adaptation to traffic and power consumption characteristics.

In one embodiment, UE 211 may be configured with multiple BWPs, and each BWP is further configured to include multiple power profiles via config and control module 218. UE 211 monitors PDCCH and power profile switching command via PDCCH monitor and decoder 214. UE 211 also maintains timers for BWP and power profile adaptation. When the traffic characteristic for UE 211 changes, the network can send a power saving signal to UE 211 to trigger power profile adaptation, e.g., BWP+power profile switching of UE 211 via power management handling circuit 215. When traffic has been digested and becomes sporadic, then power profile adaptation can be triggered based on timers, e.g., a timer for BWP adaptation and another timer for power profile adaptation, via power management handling circuit 215.

When it comes to the configuration of adapted parameters, it is important to examine the relative energy contributions of different components to the average power consumption. In so doing, it is possible to prioritize different power saving configuration, which leads to recommendations on how these parameters can be configured to give good UE power consumption while avoiding unnecessary constraints on network flexibility. It is observed that reduction of bandwidth leads to substantial reductions in UE energy consumption. Therefore, it is natural to consider the UE power profile configuration method based on the framework of BWP. A BWP consists of a continuous range of physical resource blocks (PRB) in frequency domain and whose occupied bandwidth is the subset of the bandwidth of the associated carrier. For each UE, there is at most one active downlink (DL) BWP and at most one active uplink (UL) BWP at a given time for a serving cell. As a result, power consumption is reduced because UE is only required to monitoring the smaller frequency range of the active BWP.

Figure 3:
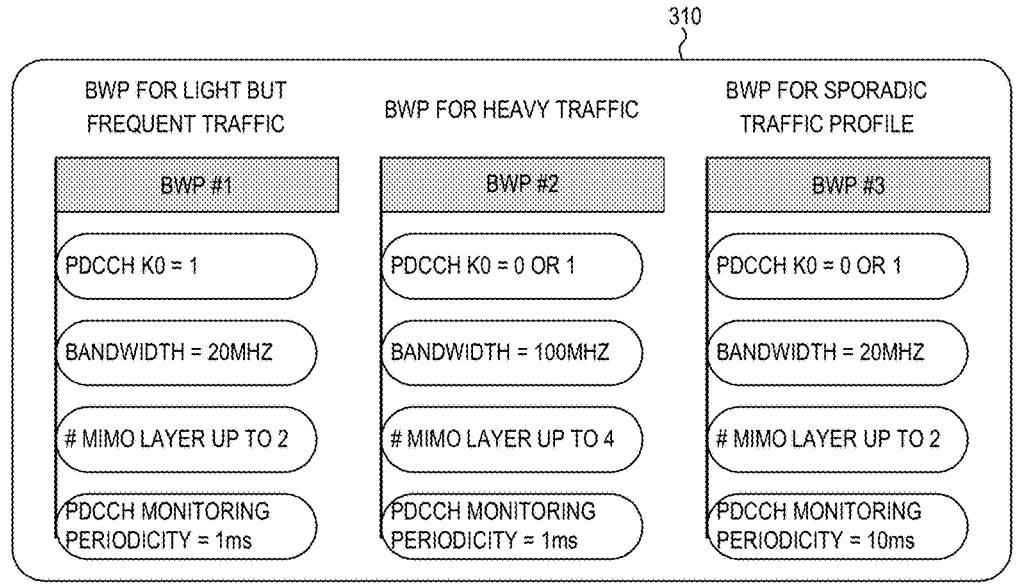
FIG. 3 illustrates one embodiment of UE power profile based on bandwidth part (BWP) framework in accordance with one novel aspect.

FIG. 3 illustrates one embodiment of UE power profile based on bandwidth part (BWP) framework in accordance with one novel aspect. One of the motivations for BWP is UE power saving by bandwidth adaptation based on the traffic characteristic. Additional power consumption relevant parameters can be incorporated in BWP configuration as well, and UE power saving can be achieved by adapting more power-related parameter configurations in different domains besides the bandwidth. In the example of FIG. 3, a UE is configured with three BWPs (BWP #1, BWP #2, and BWP #3) for the purpose of serving light-but-frequent traffic, heavy traffic, and sporadic traffic, respectively. As depicted by Table 310, the indicated values of parameters in each BWP are chosen in a power efficient manner so that under the associated traffic characteristic, the performance metrics of throughput, latency, etc., are not degraded. When the traffic characteristic for a UE changes, the network can send a power saving signal to the UE to trigger power profile adaptation, e.g., BWP switching. When traffic has been digested and becomes sporadic, then power profiled adaptation can be triggered based on timer.

However, shortcomings of power consumption configuration solely based on BWP framework still need to be identified. For example, flexibility in adaptation is limited if the number of configured BWPs is not large. Taking into account all identified power consumption relevant parameters, the flexibility in power consumption configuration in serving different traffic types solely based on BWP is insufficient. Moreover, long transition time of BWP switching may lead to inefficient operation when adaptation is frequent. Even with dynamic BWP switching, the transition time can be as long as 3 ms, during which the UE cannot transmit and receive. This consideration will certainly decrease network's intention in issuing an adaptation command. Lastly, adaptation for parameters which are non-BWP specific needs extra handling. Besides, since configuration of BWP comprises BWP-Uplink and BWP-Downlink, parameters which are non-link-direction specific also need additional handling.

Figure 4:
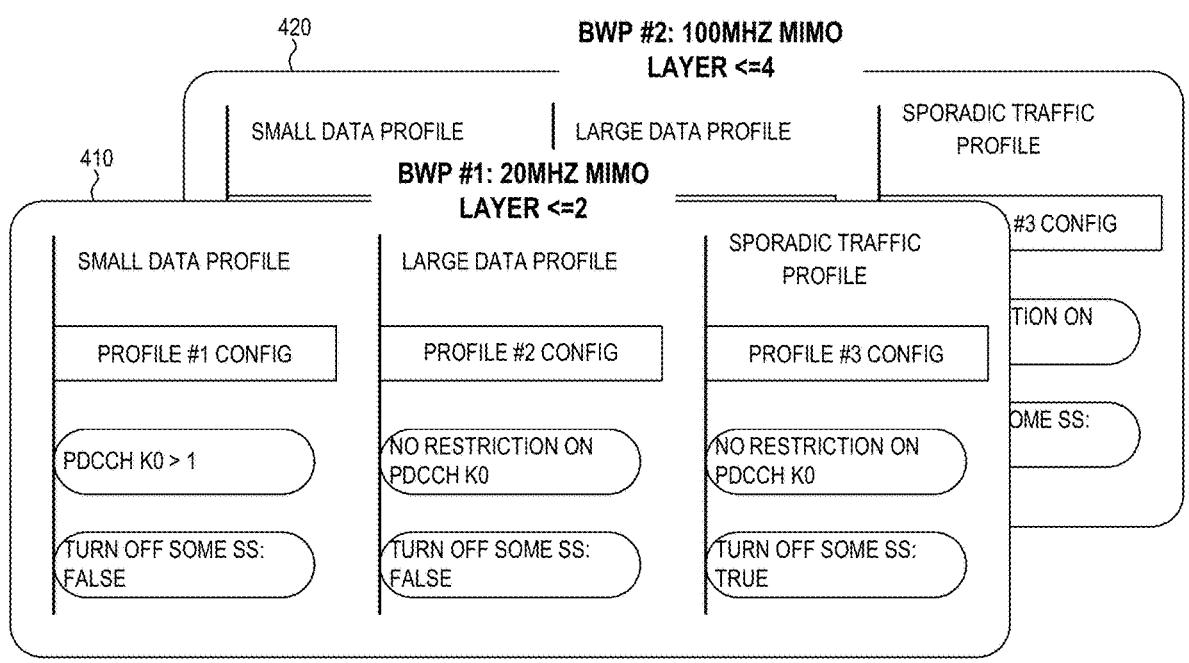
FIG. 4 illustrates one embodiment of UE profile configuration within each bandwidth part (BWP) in accordance with one novel aspect.

FIG. 4 illustrates one embodiment of UE profile configuration within each bandwidth part (BWP) in accordance with one novel aspect. Due to the drawbacks of power consumption configuration based on BWP, a configuration method based on hybrid of BWP and power profile is proposed. A UE is configured with multiple BWPs in a serving cell, and each BWP includes a set of power profiles. Within a BWP, only one of the power profiles is active at a time; the parameter configuration of each power profile corresponds to a specific traffic characteristic. In the example of FIG. 4, the UE is configured with two BWPs, BWP #1 (410) has 20 MHx bandwidth and BWp #2 (420) has 100 MHz bandwidth. Within each BWP, three power profiles are configured: one power profile is for small data traffic, another for large data traffic, and the other for sporadic traffic profile.

In order to reduce the transition time of UE adaptation, the adapted parameters can be partitioned into two categories. One category is for those parameters with long transition time, and the other category is for those parameters without long transition time. A simple example of categorization is RF relevant parameters, including retuning the local oscillator, reconfiguring the RF chain for more or less bandwidth, etc., and baseband processing relevant parameters, for which a short switching time is expected. For example, in FIG. 4, the bandwidth and the maximum number of MIMO layers are RF parameters, so they are configured in BWP. Search space configurations and $K_0$ are considered as baseband parameters, and their range can be restricted in power profiles. In so doing, different transition time for RF relevant parameters and for baseband parameters can be separately defined, and the transition time for adaptation involved with only baseband parameters can be reduced.

Figure 5:
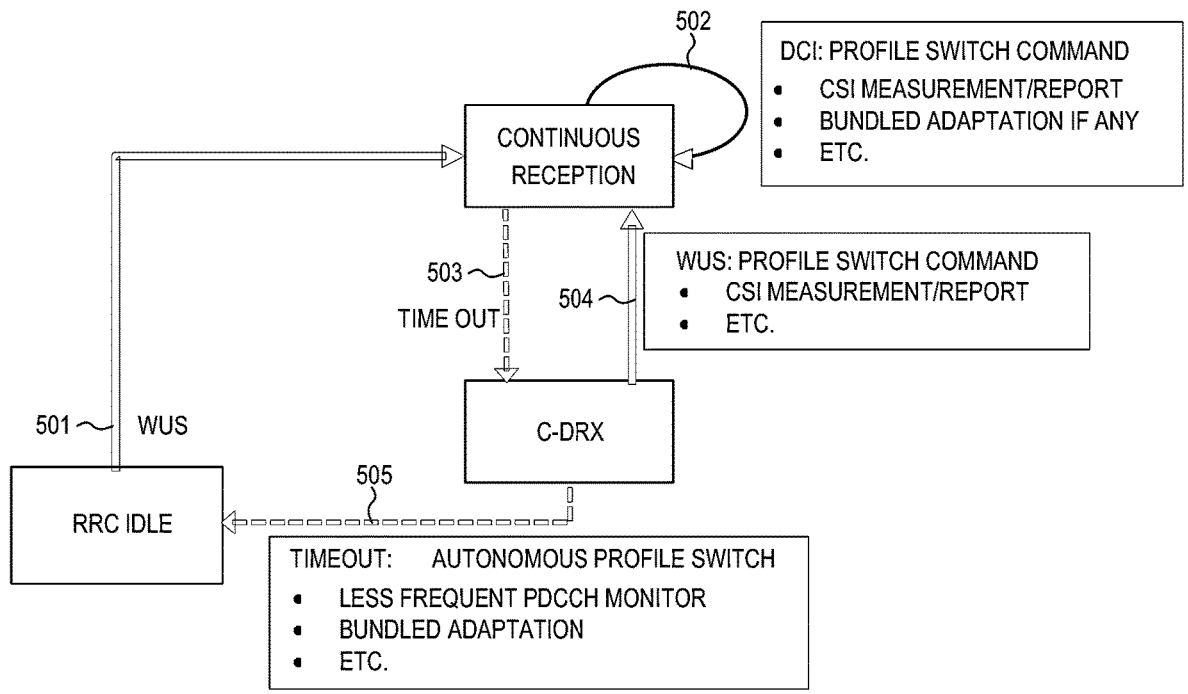
FIG. 5 illustrates a UE state machine and mechanism of UE power profile adaptation triggering in accordance with one novel aspect.

FIG. 5 illustrates a UE state machine and mechanism of UE power profile adaptation triggering in accordance with one novel aspect. When a UE connects to the network, the UE is configured with multiple BWPs and each BWP is configured with a set of PHY power profiles. Each PHY power profile corresponds to restricted ranges of configured values for power-related parameters. Later on, switching among different PHY power profiles of BWPs can be indicated from the network to the UE by RRC, MAC CE, or DCI signaling, or autonomously performed by the UE. The UE is initially in RRC idle mode and the associated power profile for idle mode is also configured. In step 501, the UE receives a paging PDCCH from the network and the UE goes to RRC connected mode with continuous reception. In one novel aspect, the UE also receives a wakeup signal (WUS), which either is embedded in the paging signal or is a separate signal, which indicates a power profile to be applied for continuous reception.

In step 502, during the continuous reception mode, the UE monitors PDCCH for DCI (e.g., in every slot). UE also performs CSI measurements and reporting, bundled adaptation if any, etc. Upon receiving power profile switching command (e.g., via the DCI), UE may adapt to a different power profile to save power. If UE has no activity for a while and is timed out, then in step 503, UE goes to connected mode DRX (C-DRX) mode with discontinuous reception. In one novel aspect, there is a timer to trigger UE power adaptation. When the timer for the active power profile expires, the UE may autonomously switch to a default power profile. In step 504, from C-DRX mode, UE may go back to continuous reception mode upon receiving a data scheduling PDCCH. In addition, a power profile switching command (e.g., via WUS), can be embedded in the PDCCH or can be another separate signal sent to the UE, indicates a power profile to be applied for continuous reception. In step 505, from C-DRX mode, UE may also go back to RRC idle mode if UE has no activity for a while and is timed out. Again, UE may autonomously switch to a default power profile when the timer for the active power profile expires.

Figure 6:
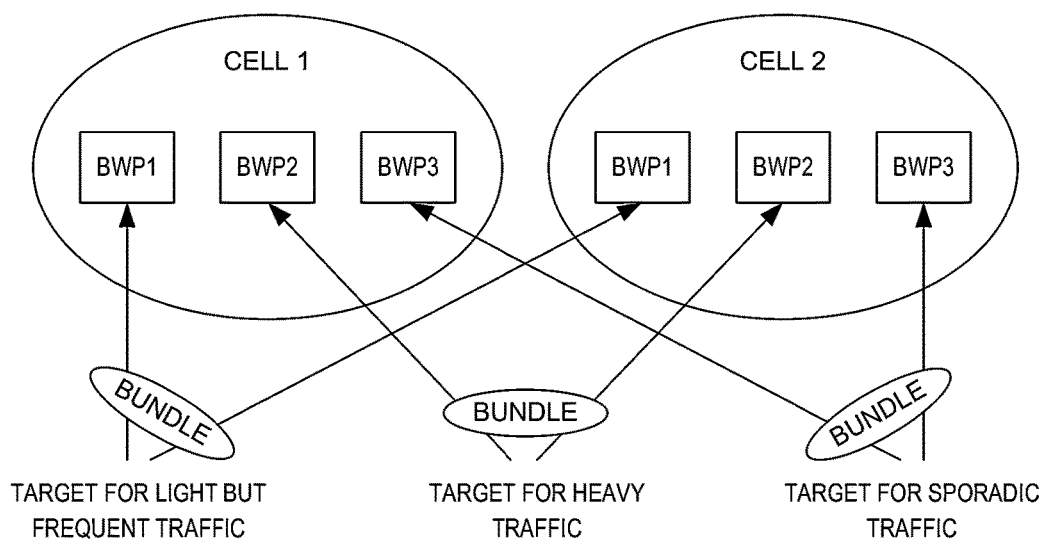
FIG. 6 illustrates the concept of power profile bundling among different component carriers (CCs) under carrier aggregation (CA).

FIG. 6 illustrates the concept of power profile bundling among different component carriers (CCs) under carrier aggregation (CA). In case of CA, a UE is configured with BWPs in each serving cell. The active BWP (equivalently, the active power profile configuration) of each serving cell should bit the current traffic characteristic of the UE. Therefore, active BWPs that are associated with the same traffic characteristic across serving cells can be bundled. In the example of FIG. 6, Cell 1 and Cell 2 both are configured with three BWPs: BWP1, BWP2, and BWP3. The BWP1 for Cell 1 and BWP1 for Cell 2 are bundled, target for light-but-frequent traffic. The BWP2 for Cell 1 and BWP2 for Cell 2 are bundled, target for heavy traffic. The BWP3 for Cell 1 and BWP3 for Cell 2 are bundled, target for sporadic traffic. UE can apply bundled power profile adaptation with the bundled BPWs or power profiles under CA.

Figure 7:
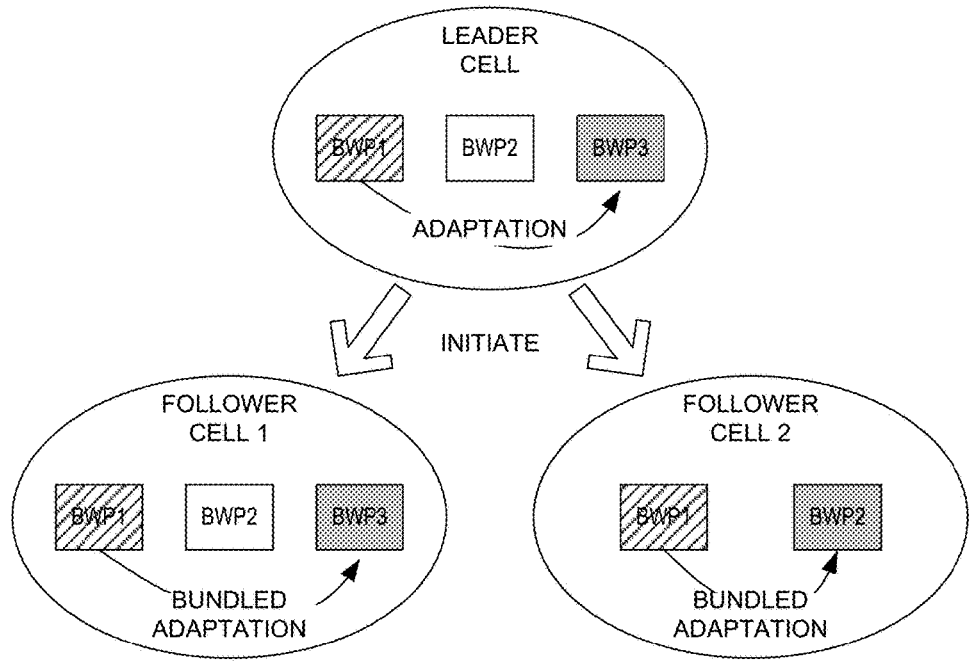
FIG. 7 illustrates one embodiment of UE power profile adaptation using bundled adaption among leader cell and follower cells under CA.

FIG. 7 illustrates one embodiment of UE power profile adaptation using bundled adaption among leader cell and follower cells under CA. Among all serving cells, some cells are selected as leader cells for adaptation of power consumption configuration; each leader cell is associate with a set of follower cells. The key idea is the active power consumption configuration of a follower cell is determined by that of the associated leader cell, which implies a switch of power consumption configuration in a leader cell initiates a configuration switch in the associated follower cells. In the embodiment of FIG. 7, the leader cell is associated with flower cell 1 and follower cell 2. When UE adapts from BWP1 to BWP3 in the leader cell, this adaptation initiates the adaptation in the two follower cells. In follower cell 1, adaptation is from BWP1 to BWP3. In follower cell 2, adaptation is from BWP1 to BWP2, which implies BWP1 of the leader cell and BWP1 of follower cell 2 are bundled; BWP3 of the leader cell and BWP2 of follower cell 2 are bundled. The bundling relation can be simply based on the BWP index or a combination of the BWP index and some predefined conditions. The advantage of the bundling concept in carrier aggregation includes at least a) less overhead in triggering UE adaptation, and b) simplicity in coordination of adaptation among serving cells.

When the traffic is heavy, a leader cell and all the associated follower cells should be adapted to wide bandwidth, large number of MIMO layers, frequent PDCCH monitoring, etc., to digest the traffic rapidly. To enable this operation, power consumption configurations for heavy traffic in the leader cell and associated follower cells are bundled. When the heavy traffic is gone and becomes sporadic, the leader cell can be adapted to a configuration with a large PDCCH monitoring periodicity; at the same time, the PDCCH search spaces in the follower cells can be disabled to save UE power consumption in PDCCH monitoring. Thus, a power consumption configuration with long PDCCH monitor periodicity in the leader cell can be bundled with power consumption configurations without PDCCH monitoring in the follower cells.

Figure 8:
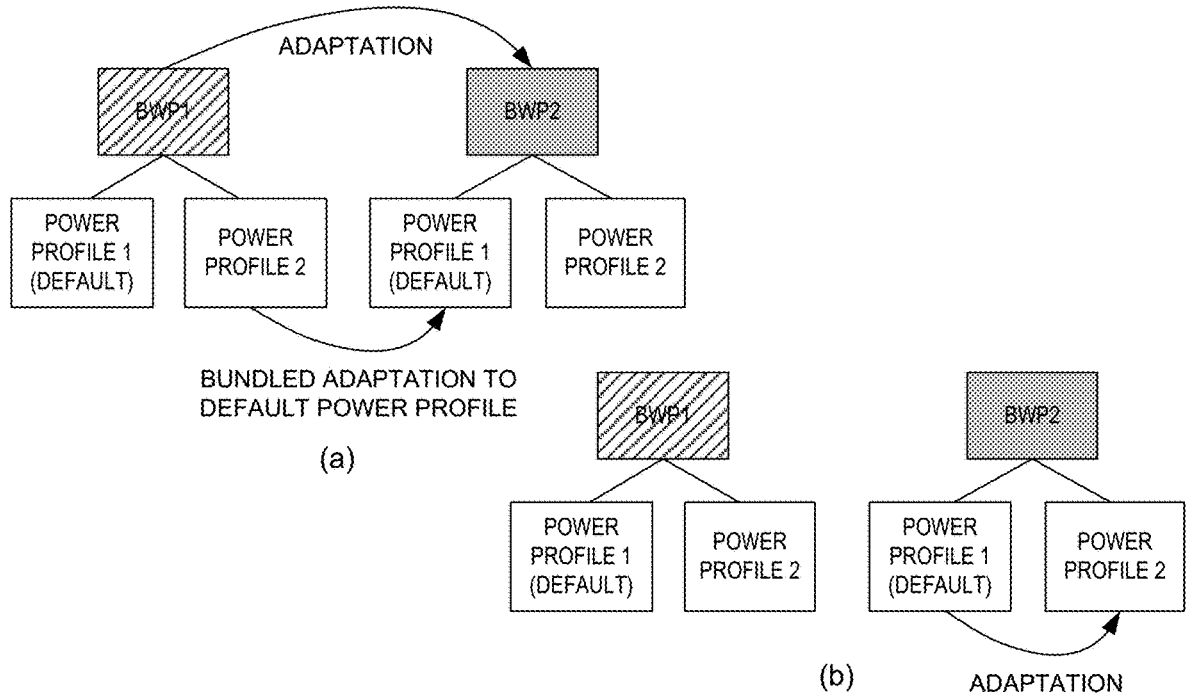
FIG. 8 illustrates a first embodiment of using power saving signal to trigger UE power profile adaptation in accordance with one novel aspect.

FIG. 8 illustrates a first embodiment of using power saving signal to trigger UE power profile adaptation in a single cell in accordance with one novel aspect. In the embodiment of FIG. 8, a UE is configured with two BWP1 and BWP2, and each BWP is further configured with a power profile 1 and power profile 2, power profile 1 is the default profile. When the traffic characteristic for a UE changes, the network can send a power saving signal to the UE to trigger power profile adaptation, e.g., BWP+power profile switching. In FIG. 8(a), the adaptation at BWP level can be triggered by DCI format 0_1/1_1 that carries a BWP switching signal, for UE to switch from BWP1 to BWP2. As a result, UE switches from power profile 2 of BWP1 to power profile 1 of BWP2, and the adaptation to the default power profile level happens autonomously due to the trigger at the BWP level. In FIG. 8(b), the adaptation is trigger by a power saving signal. Upon receiving a power profile switching command, UE switches from power profile 1 to power profile 2 of BWP2. Note that the power profile switching command can trigger UE to switch from default or non-default power profile to another power profile that is non-default or default.

In the case of carrier aggregation, UE is configured multiple BWPs in each serving cell; in each BWP, a set of power profiles are configured. Some serving cells are selected as leader cells, and each leader cell is associate with a set of follower cells. A power profile in the leader cell is bundled with a power profile in an associated follower cell if they target for the same traffic characteristic. Assume that in a leader cell has the same power profile configuration as in FIG. 8, and the UE is adapted from 'power profile 2 of BWP1' to 'power profile 2 to BWP2'. The UE adaptation in the leader cell is exactly the same as that depicted in FIGS. 8(a) and 8(b). In an associated follower cell, due to the adaptation of FIG. 8(a) in the leader cell, a bundled BWP adaptation is initiated (see FIG. 7); meanwhile, the default power profile of the new active BWP becomes active in the follower cell. In the associated follower cell, during the adaptation of FIG. 8(b) in the leader cell, a bundled power profile adaptation is initiated. The power profile adaptation in follower cells is autonomous, which is initiated by the power profile adaptation in the associated leader cell.

Figure 9:
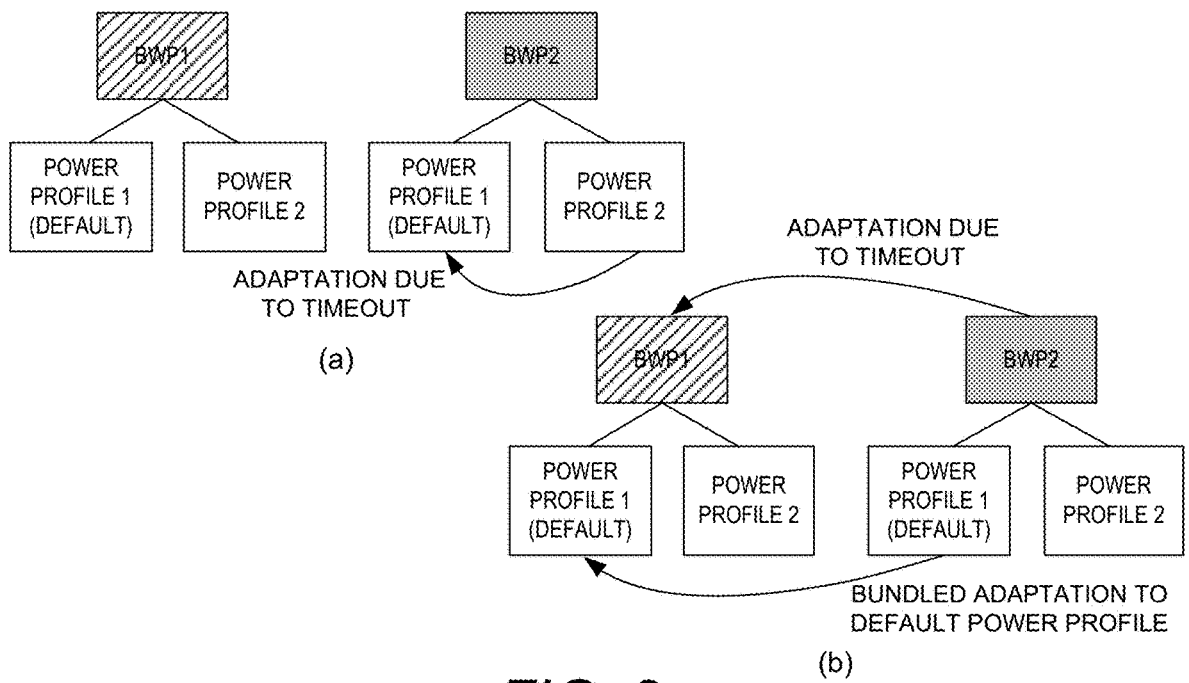
FIG. 9 illustrates a second embodiment of using timer to trigger UE power profile adaptation in accordance with one novel aspect.

FIG. 9 illustrates a second embodiment of using timer to trigger UE power profile adaptation in a single cell in accordance with one novel aspect. In the embodiment of FIG. 9, a UE is configured with two BWP1 and BWP2, and each BWP is further configured with a power profile 1 and power profile 2, power profile 1 is the default profile. When traffic has been digested and becomes sporadic, then power profile adaptation can be triggered based on timer. When UE does not receive valid unicast PDCCH for a period of time, it is expected data have been sent and the chance for additional valid PDCCH is low. Therefore, UE is adapted to a BWP and/or a power profile with infrequent PDCCH monitoring to save power consumption. In the example of FIG. 9, assume the timer for BWP adaptation expires at a duration $T_1$, and the timer for adaptation of power profiles under the BWP expires at a duration $T_2$ which is less than $T_1$.

The detailed mechanism of adaptation due to time out in the configuration method of BWP+power profile is depicted in FIG. 9. In FIG. 9(a), the adaptation at power profile level is first triggered by a timer which expires at time duration $T_2$, where UE switches from power profile 2 to the default power profile 1. In FIG. 9(b), the adaptation at BWP level is triggered by a timer which expires at time duration $T_1$. When the duration $T_1$ is reached, adaptation from BWP2 to BWP1 is then triggered; at the same time, the default power profile 1 of BWP1 becomes active, this bundled adaptation to default power profile happens autonomously.

In the case of carrier aggregation, UE is configured multiple BWPs in each serving cell; in each BWP, a set of power profiles are configured. Some serving cells are selected as leader cells, and each leader cell is associate with a set of follower cells. A power profile in the leader cell is bundled with a power profile in an associated follower cell if they target for the same traffic characteristic. Assume that in a leader cell has the same power profile configuration as in FIG. 9, and the UE is adapted from 'power profile 2 of BWP2' to 'power profile 1 to BWP1'. The UE adaptation in the leader cell is exactly the same as that depicted in FIGS. 9(a) and 9(b). The adaptation in associated follower cells is autonomous, which is initiated by adaptation in the leader cell. The determination of active BWP in the follower cell is based on the bundling relation of at the BWP level. Similarly, the determination of active power profile in the follower cell is based on the bundling relation of at the power profile level.

Figure 10:
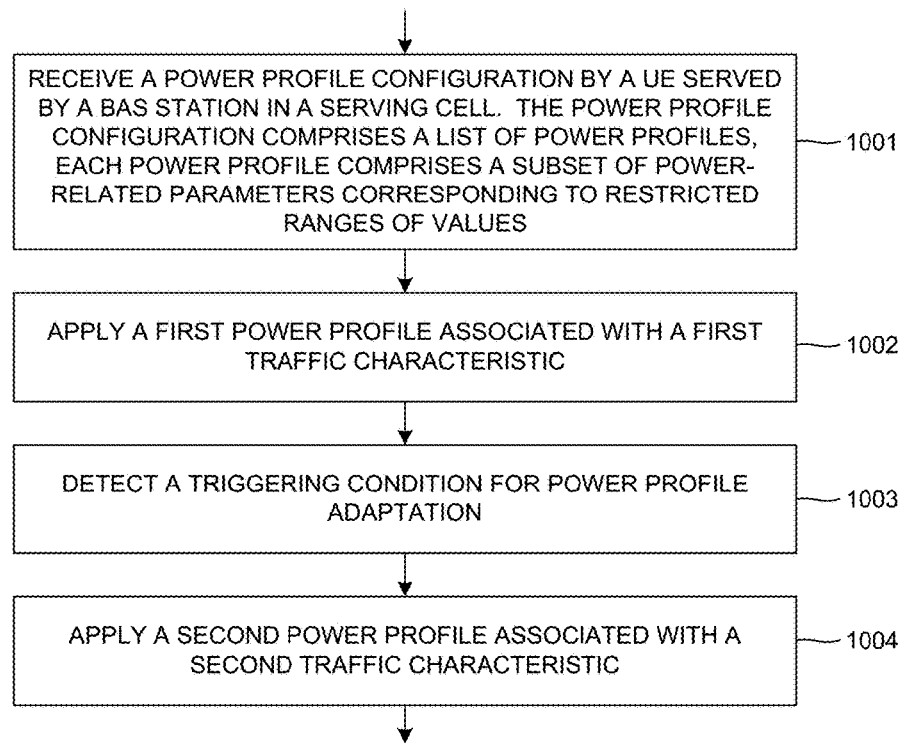
FIG. 10 is a flow chart of a method of triggering UE power profile adaption for power saving in accordance with one novel aspect.

FIG. 10 is a flow chart of a method of triggering UE power profile adaption for power saving in accordance with one novel aspect. In step 1001, a UE receives a power profile configuration served by a base station in a serving cell. The power profile configuration comprises a list of power profiles, each power profile comprises a subset of power-related parameters corresponding to restricted ranges of values. In step 1002, the UE applies a first power profile associated with a first traffic characteristic. In step 1003, the UE detects a triggering condition for power profile adaptation. In step 1004, the UE applies a second power profile associated with a second traffic characteristic.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving a power profile configuration for a single bandwidth part (BWP) by a user equipment (UE) served by a base station in a serving cell, wherein the power profile configuration for the single BWP comprises at least two power profiles, wherein each power profile comprises a subset of power-related parameters corresponding to restricted ranges of values;
detecting a triggering condition for power profile adaptation; and
applying one of the power profiles for the single BWP according to the detected triggering condition for power profile adaptation.

2. The method of claim 1, wherein the subset of power-related parameters comprises at least one of a bandwidth, a time duration between a physical downlink control channel (PDCCH) and corresponding scheduled data, a PDCCH monitor periodicity, and a maximum number of MIMO layers.

3. The method of claim 1, wherein the triggering condition is satisfied when the UE receives a power profile switching command or detecting a power profile timer expiry.

4. The method of claim 1, wherein the UE is configured for carrier aggregation (CA) with a leader cell and one or more associated follower cells.

5. The method of claim 4, wherein a power profile of the leader cell is bundled to a corresponding power profile of the associated follower cells with respect to power profile adaptation.

6. The method of claim 1, wherein the UE is configured with multiple BWPs under a carrier, and wherein each BWP has a default power profile.

7. The method of claim 6, wherein upon receiving a BWP switching command, the UE switches from a first power profile of a first BWP to a default power profile of a second BWP.

8. The method of claim 6, wherein upon receiving a power profile switching command, the UE switches from a default or a non-default power profile of a BWP to the second power profile of the BWP.

9. The method of claim 6, wherein the UE is configured with a first timer for power profile adaptation within a BWP, wherein the UE is configured with a second timer for BWP adaptation, and wherein the first timer is smaller than the second timer.

10. The method of claim 9, wherein the UE switches from a first power profile of a first BWP to a default power profile of the first BWP due to first timer expiry, and then switches from the default power profile of the first BWP to a default power profile of a second BWP due to the second timer expiry.

11. A User Equipment (UE), comprising:
a receiver that receives a power profile configuration for a single bandwidth part (BWP) served by a base station in a serving cell, wherein the power profile configuration for the single BWP comprises at least two power profiles, wherein each power profile comprises a subset of power-related parameters corresponding to restricted ranges of values; and
a control circuit that detects a triggering condition for power profile adaptation, wherein the UE applies one of the power profiles for the single BWP according to the detected triggering condition for power profile adaptation.

12. The UE of claim 11, wherein the subset of power-related parameters comprises at least one of a bandwidth, a time duration between a physical downlink control channel (PDCCH) and corresponding scheduled data, a PDCCH monitor periodicity, and a maximum number of MIMO layers.

13. The UE of claim 11, wherein the triggering condition is satisfied when the UE receives a power profile switching command or detecting a power profile timer expiry.

14. The UE of claim 11, wherein the UE is configured for carrier aggregation (CA) with a leader cell and one or more associated follower cells.

15. The UE of claim 14, wherein a power profile of the leader cell is bundled to a corresponding power profile of the associated follower cells with respect to power profile adaptation.

16. The UE of claim 11, wherein the UE is configured with multiple BWPs under a carrier bandwidth, and wherein each BWP has a default power profile.

17. The UE of claim 16, wherein upon receiving a BWP switching command, the UE switches from a first power profile of a first BWP to a default power profile of a second BWP.

18. The UE of claim 16, wherein upon receiving a power profile switching command, the UE switches from a default or a non-default power profile of a BWP to the second power profile of the BWP.

19. The UE of claim 16, wherein the UE is configured with a first timer for power profile adaptation within a BWP, wherein the UE is configured with a second timer for BWP adaptation, and wherein the first timer is smaller than the second timer.

20. The UE of claim 19, wherein the UE switches from a first power profile of a first BWP to a default power profile of the first BWP due to first timer expiry, and then switches from the default power profile of the first BWP to a default power profile of a second BWP due to the second timer expiry.

* * * * *